(12) United States Patent
Cnossen et al.

(10) Patent No.: US 12,276,251 B2
(45) Date of Patent: *Apr. 15, 2025

(54) WIND TURBINE ROTOR BLADE WITH ACCESS WINDOW

(71) Applicant: LM Wind Power A/S, Kolding (DK)

(72) Inventors: Jelmer Cnossen, Eastleigh (GB); Paul Damian Michael Todd, Eastleigh (GB)

(73) Assignee: Blade Dynamics Limited, Eastleigh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,268

(22) Filed: Apr. 9, 2024

(65) Prior Publication Data

US 2024/0254962 A1  Aug. 1, 2024

Related U.S. Application Data

(63) Continuation of application No. 17/912,653, filed as application No. PCT/EP2021/057142 on Mar. 19, 2021, now Pat. No. 11,971,010.

(30) Foreign Application Priority Data

Mar. 20, 2020 (GB) ...................... 2004035

(51) Int. Cl.
  *F03D 1/06* (2006.01)

(52) U.S. Cl.
  CPC ...... *F03D 1/0675* (2013.01); *F05B 2240/302* (2013.01); *F05B 2240/303* (2020.08); *F05B 2240/304* (2020.08); *F05B 2240/307* (2020.08)

(58) Field of Classification Search
  CPC .................................................... F03D 1/0675
  See application file for complete search history.

(56) References Cited

U.S. PATENT DOCUMENTS

| | | | |
|---|---|---|---|
| 9,388,789 B2 | 7/2016 | Hibbard et al. | |
| 11,971,010 B2* | 4/2024 | Cnossen ............... | F03D 1/0675 |
| 2015/0167473 A1 | 6/2015 | Olson | |
| 2018/0180031 A1 | 6/2018 | Klein et al. | |
| 2018/0313335 A1 | 11/2018 | Vanderwalker et al. | |
| 2019/0271298 A1 | 9/2019 | Eriksen et al. | |

FOREIGN PATENT DOCUMENTS

| | | | |
|---|---|---|---|
| CA | 2837985 A1 | 12/2012 | |
| EP | 3372826 A1 | 9/2018 | |
| WO | WO2012/167891 A1 | 12/2012 | |

* cited by examiner

*Primary Examiner* — Michael L Sehn
(74) *Attorney, Agent, or Firm* — Dority & Manning, P.A.

(57) ABSTRACT

The present invention relates to a wind turbine blade comprising an aerodynamic shell having an outer surface forming at least part of an exterior surface of the wind turbine blade and an inner surface. An access window extends through the shell. A panel is arranged within a recessed portion at the inner surface of the shell adjacent to the access window for closing the access window.

16 Claims, 7 Drawing Sheets

Figure 1:
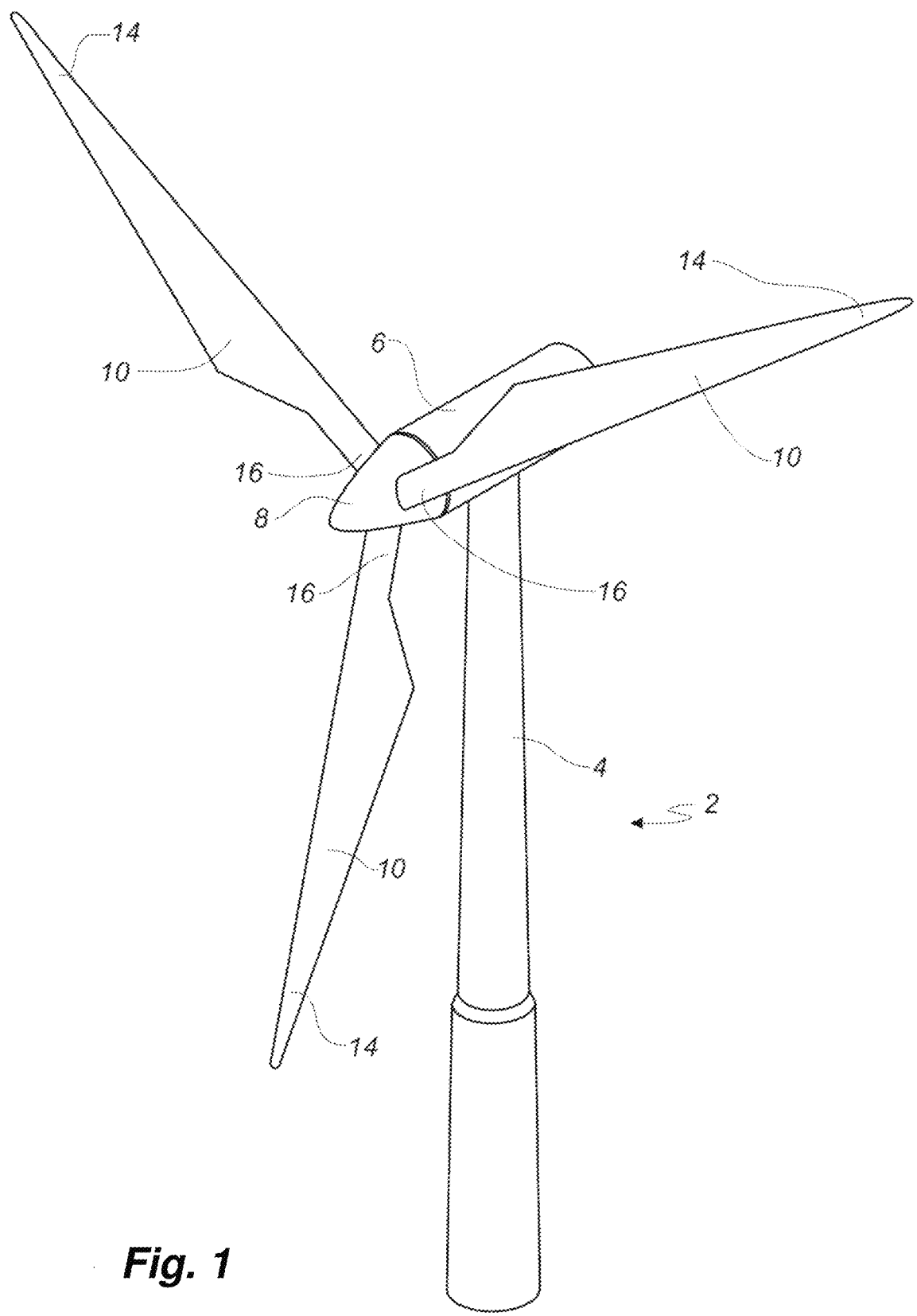

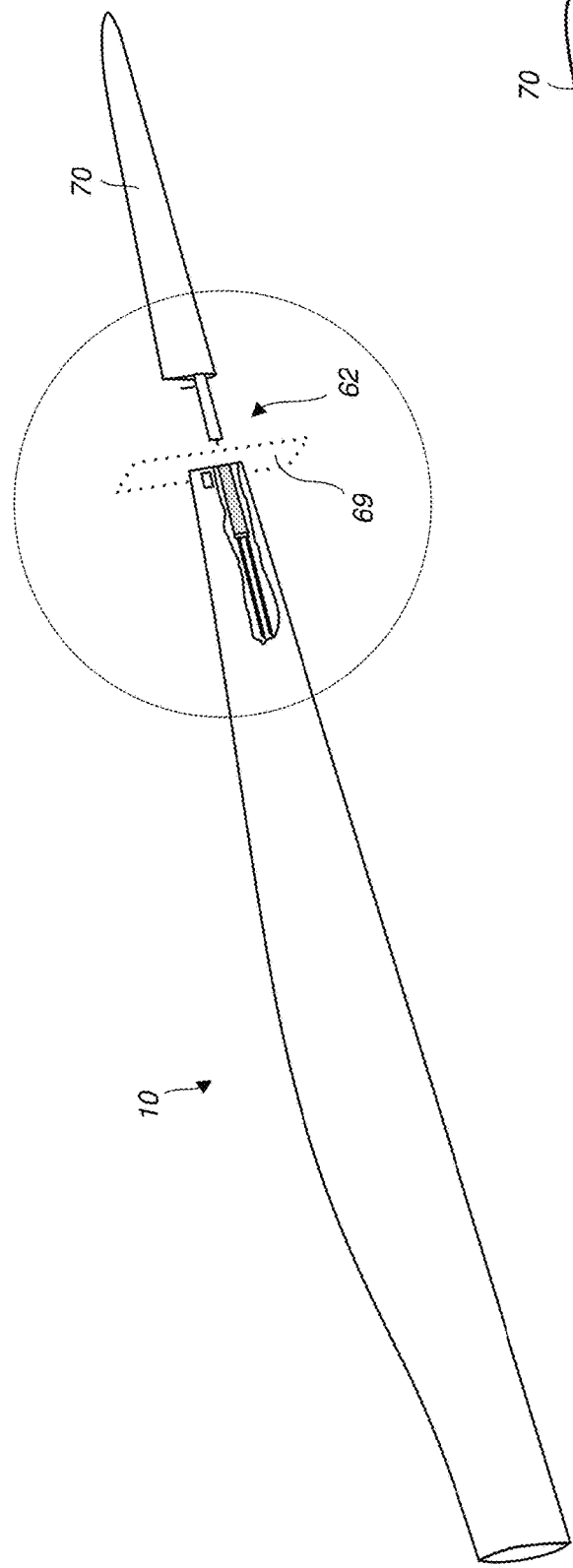
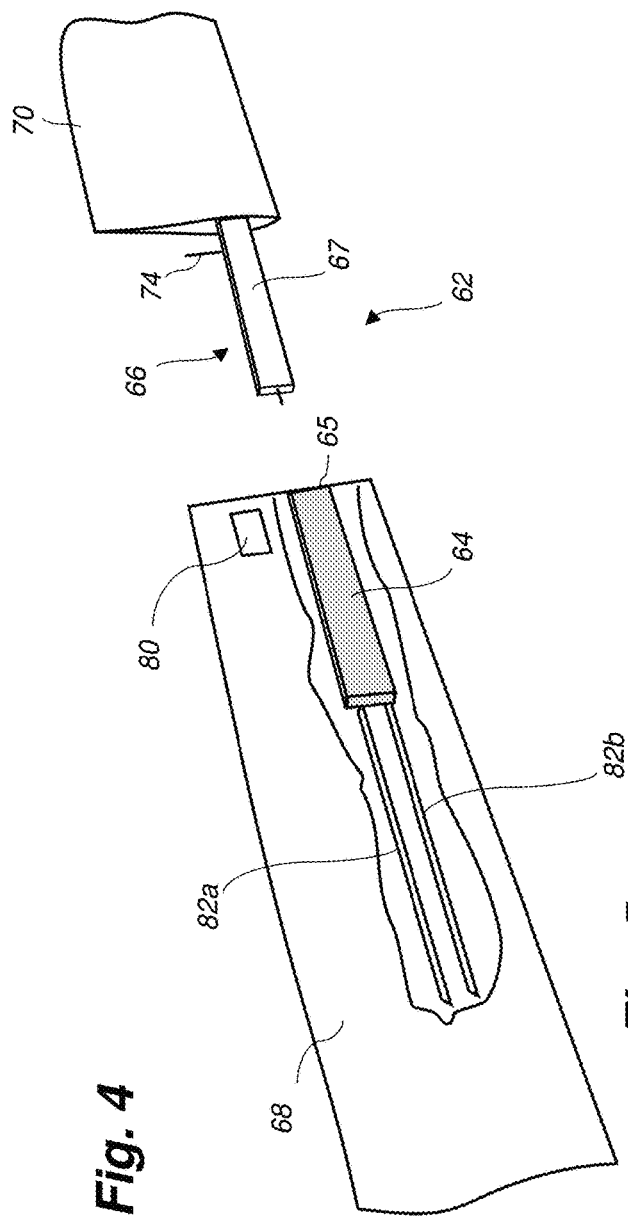
Fig. 4
Fig. 5

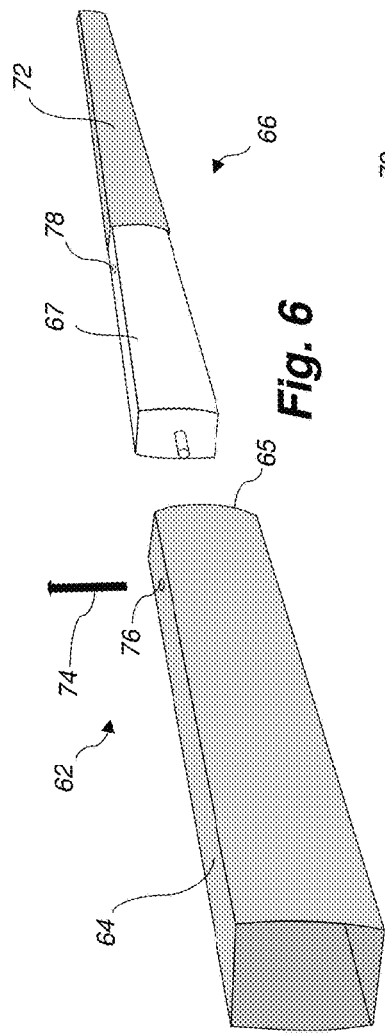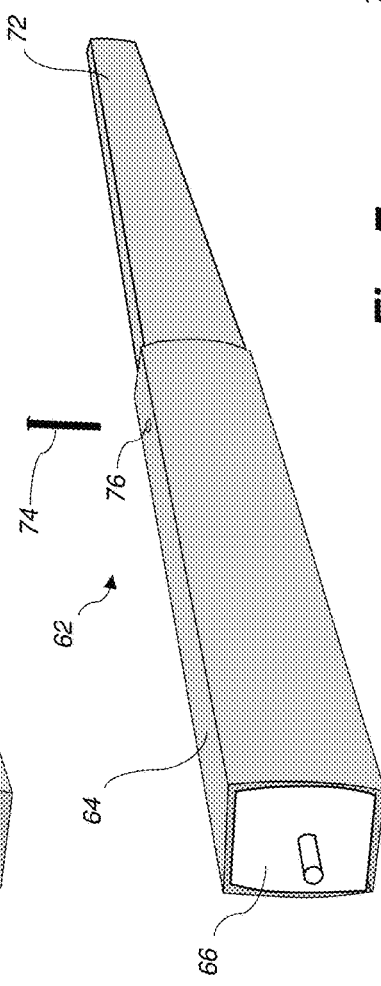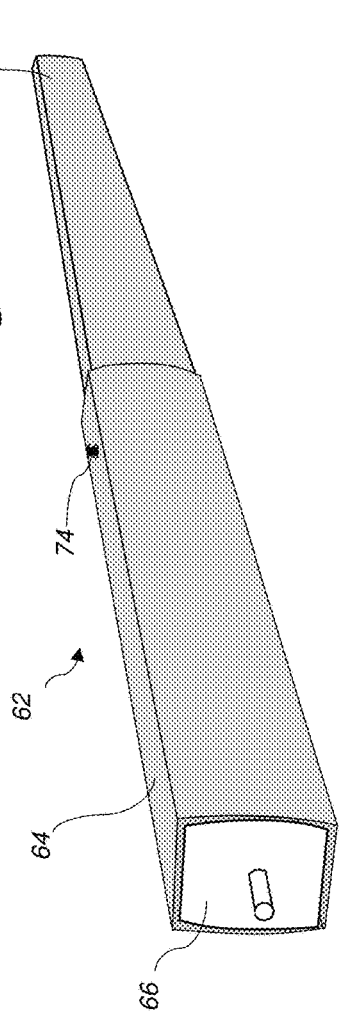

WIND TURBINE ROTOR BLADE WITH ACCESS WINDOW

RELATED APPLICATIONS

The present application is a continuation of a continuation of U.S. patent application Ser. No. 17/912,653, filed on Sep. 19, 2022, which claims priority to PCT Application Serial Number PCT/EP2021/057142, filed on Mar. 19, 2021, which is incorporated by reference herein.

FIELD OF THE INVENTION

The present invention relates to a wind turbine blade comprising an access window extending through its shell, as well as to a method of manufacturing the wind turbine blade.

BACKGROUND OF THE INVENTION

Wind power is one of the fastest-growing renewable energy technologies and provides a clean and environmentally friendly source of energy. Typically, wind turbines comprise a tower, generator, gearbox, nacelle, and several rotor blades. The kinetic energy of wind is captured using known airfoil principles. Modern wind turbines may have rotor blades that exceed 90 meters in length.

Wind turbine blades are usually manufactured by forming a shell body from two shell parts or halves comprising layers of woven fabric or fibre and resin. Spar caps or main laminates are usually integrated within the shell halves and may be combined with shear webs or spar beams to form structural support members. Spar caps or main laminates may be joined to, or integrated within, the inside of the suction and pressure halves of the shell.

As the size of wind turbines increases, the manufacturing and transporting of wind turbine blades becomes more challenging and costly. As a solution to this problem wind turbine blades can be provided in two or more spanwise segments. This can result in an easier manufacturing process and may reduce the cost of transportation and erection of wind turbines. The respective blade segments may be transported to the erection site individually, where they can be assembled to form the wind turbine blade.

However, several challenges arise from the segmentation of wind turbine blades. These often relate to the manufacturing and joining of the shell segments, including load bearing structures such as spar beams, shear webs or other internal components. Due to the fact that internal parts of a wind turbine blade may have to be re-connected or disconnected as part of such processes, a suitable access solution needs to be provided to allow access to internal blade parts from the outside of the blade.

WO 2011/067323 A2 discloses a sectional blade for a wind turbine, the blade comprising a first and a second blade section extending in opposite directions from a blade joint and being structurally connected by a spar bridge. A receiving section holds the spar bridge via a bearing member, which comprises two bearing halves. The bearing halves are assembled by bolts and connected to a spar section. The bolts may be tightened through openings in the blade shells, which may be filled afterwards to provide a smooth outer surface of the blade.

WO 2012/167891 A1 relates to a rotor blade of a wind turbine having an accessible cavity, wherein the rotor blade shell has a closable opening with a hatch closing flush with the outer layer of the rotor blade shell. The opening is designed for rescuing maintenance workers in the event of an accident or emergency. The hatch is permanently attached to the shell with a hinge for opening the hatch with an inwardly or outwardly directed pivot movement.

Existing access solutions have a number of challenges including the required provision of a closing hatch/panel which needs to be securely fixed to the blade to avoid unintended detachment of the panel, possible water ingress inside the blade and pressure leakage around the edges of the access panel. Such undesired pressure leakage may affect aerodynamic performance of the blade. Also, the provision of a great number of mechanical fasteners may weaken the shell laminate in the area of the access opening. Furthermore, the design of the closing panel and securing mechanism must ensure that aerodynamic drag and noise increase from the panel and/or securing mechanism are negligible. There is consequently a need in the art for providing an improved and/or simplified access solution for wind turbine blades.

It is therefore an object of the present invention to provide a wind turbine blade with an improved access opening arrangement.

Particularly, it is an object of the present invention to provide an access opening arrangement for a wind turbine blade or related structures that is easy to manufacture and to assemble.

It is another object of the present invention to provide an access opening arrangement for a wind turbine blade or related structures that has minimal impact on blade performance, such as aerodynamic properties.

It is a further object of the present invention to provide an access opening arrangement for a wind turbine blade or related structures that is safe and avoids pressure leakage from within the blade and eliminates the risk of detachment of the panel from the blade.

SUMMARY OF THE INVENTION

It has been found that one or more of the aforementioned objects can be obtained by a wind turbine blade having a profiled contour including a pressure side and a suction side, and a leading edge and a trailing edge with a chord having a chord length extending therebetween, the wind turbine blade extending in a spanwise direction between a root end and a tip end, wherein the blade comprises an aerodynamic shell having an outer surface forming at least part of an exterior surface of the wind turbine blade and an inner surface, an access window extending through the shell, wherein the aerodynamic shell comprises a recessed portion at the inner surface of the shell adjacent to the access window, and a panel arranged within the recessed portion at the inner surface of the shell for closing the access window.

Thus, the present invention advantageously provides an inwardly mounted panel for closing the access window extending through the shell. During operation of the wind turbine blade pressure differences between the inside and the outside of the blade occur, wherein air pressure builds up inside the blade due to the centrifugal effect. By contrast, on the outside of the blade, air pressure is reduced due to the aerodynamic shape of the airfoil and the resulting high-velocity air stream. It was found that, by using an inwardly mounted panel according to the present invention, the resulting pressure differential pushes the panel towards the recessed portion, optionally via a gasket, thus reducing the risk of pressure leakage from the inside of the blade and water ingress into the blade. In case any fixture between the panel and the inner blade surface would fail, the present invention reduces the risk of the panel being blown off the blade which could damage other turbine components or even harm people. Another advantage of the inwardly mounted panel of the present invention is that, in case fasteners are used, the number of fasteners in the blade surface can be reduced to the minimum only required to keep the panel in place, rather than having to bear the entire load exerted on the panel. Using fewer fasteners is advantageous as this will typically lower the increase of aerodynamic drag and noise. This will also typically lead to an improved finish and to the reduction of ply damage. In addition, the panel can be net edge moulded, thus requiring no manual boundary trimming. Also, all thicknesses can be controlled by fixed tools, thus reducing manual error and improving the quality of fit.

The aerodynamic shell will typically comprise two shell halves, a pressure side shell half and a suction side shell half. The shell halves, optionally including one or more types of outer coating, usually form a continuous outer aerodynamic surface of the blade. The shell halves will typically comprise a fibre-reinforced material, such as a resin-infused glass fibre material. Typically, the outer surface of the shell is a profiled surface, wherein preferably the access window is provided at a location of said profiled surface. In some embodiments, the access window is provided at a chordwise distance of not more than 1 metre from the trailing edge of the blade.

The access window may advantageously be configured to provide access to the interior of at least a portion of the rotor blade. The access window may be cut out or drilled through the shell body using a drill jig. It is preferred that the access window is formed in the suction side shell half of the blade. Preferably, the access window is configured to allow access to an internal spar element or shear web of the blade. Preferably, the access window is disposed between a spar element, such as a box spar, and the trailing edge of the blade. The access window may be provided by cutting the shell to form a cut-out section into and through the shell body and by removing the cut-out section to provide the access window. To this end, a template or jig of the cut-out section can be placed on the outer surface of the shell body.

In a preferred embodiment, the access window is substantially rectangular, for example having a rectangular shape or a rectangular shape with rounded corners. Thus, the access window may be formed by cutting a substantially rectangular opening into the shell, preferably into the suction side shell half of the blade, such that the shell is penetrated to allow access to an interior part of the blade.

The shell comprises a recessed portion at the inner surface of the shell adjacent to the access window. In some embodiments, the recessed portion may be provided in a stepwise design wherein the thickness of the shell decreases in one or more discreet steps towards the access window, for example as seen in a spanwise direction or as seen in a chordwise direction. In other words, the recessed portion can be provided in a stepped configuration, wherein the thickness of the shell decreases in a discrete step towards the access window. Thus, a sidewall of the recessed portion may be substantially vertical. In a preferred embodiment, the recessed portion comprises two recesses, each respective recess arranged at opposing sides adjacent to the access window, as seen in a spanwise or a chordwise direction. Thus, as seen in a spanwise or in a chordwise direction, the inner surface of the shell may comprise a first recess, followed by the access window, followed by the second recess. The recessed portion and/or each recess thereof may have an oval, square or rectangular shape.

In some embodiments, the recessed portion at the inner surface of the shell may take the form of a groove extending within the shell, adjacent to the access window and substantially parallel to the outer shell surface. In another embodiment, the recessed portion at the inner surface may comprise an annular recess surrounding the access window. The annular recess may have substantially the same shape as the panel. For example, if an elliptical panel is used, the annular recess may have a substantially elliptical form, including two separate segments of an ellipsis arranged on opposing sides at the inner surface of the blade adjacent to the access window.

The panel is arranged within the recessed portion at the inner surface of the shell for closing the access window. In other words, the panel is inwardly mounted to the shell of the blade. Advantageously, the panel is kept in a stable position by way of the geometry of the recessed portion, e.g. by one or more sidewalls of one or more recesses, preventing dislocation, in particular rotation, of the panel. Thus, in a preferred embodiment, the panel is arranged in a form-fit position within the recessed portion at the inner surface of the shell for closing the access window.

Preferably, no part of the panel extends above the outer aerodynamic surface of the shell. Typically, an annular part of the top surface of the panel will abut an inner surface of the shell within the recessed portion, preferably via one or more sealing members such as gaskets.

Each recess of the recessed portion may have a width, i.e. extent in a substantially spanwise direction, of 1-10 cm. Thus, in one embodiment, the recessed portion may comprise a first recess with a width of 1-10 cm, and a second recess with a width of 1-10 cm, the recesses being located on respective opposing sides adjacent to the access window, for example as seen in a spanwise direction or as seen in a chordwise direction. In a preferred embodiment, the access window extends over an area of not more than 0.25 m2.

The panel may be made from a fibre reinforced material. In some embodiments, the panel can be made from the same material as the shell. The outer surface of the panel can be a curved or profiled surface, which preferably has the same curvature or profile as the outer surface of the shell at the location surrounding the access window. In some embodiments, the cover member comprises a thermoplastic material, such as a thermoplastic polyurethane.

According to one embodiment, the access opening allows for inserting and/or withdrawing a chordwise locking pin into an internal blade element, such as a spar structure, preferably a spar beam or box spar. Preferably, the wind turbine blade of the present invention may comprise at least one locking pin for releasably locking two or more spar elements to each other. The wind turbine blade of the present invention preferably comprises two or more segments, such as a tip end segment and a root end segment, each segment comprising a pressure side shell member and a suction side shell member. Typically, the wind turbine blade comprises one or more shear webs or spar beams. In some embodiments, a first spar structure is arranged in a first blade segment and a second spar structure is arranged in a second blade segment.

In a preferred embodiment, the panel has a width and a length, wherein the length of the panel exceeds the width of the panel. In a preferred embodiment, the access window is substantially rectangular with a length extending in a chordwise direction and a width extending in a spanwise direction, wherein the length of the panel exceeds the length of the access window. In such embodiments, the panel can be inserted through the access window in an inclined position, wherein the length of the panel is substantially parallel to the length of the access window, followed by a rotation of the panel in a plane substantially parallel to the outer shell surface and arrangement within the recessed portion. In other embodiments, the panel can be inserted through the access window in an inclined position, wherein the length of the panel is substantially parallel to the width of the access window, followed by a rotation of the panel in a plane substantially parallel to the outer shell surface and arrangement within the recessed portion. In some embodiments, the length of the access window may exceed the width of the access window. In other embodiments, the width of the access window may exceed the length of the access window. In some embodiments, both the panel and the access window are substantially rectangular wherein the length of the panel exceeds the length of the access window, or wherein the width of the panel exceeds the width of the access window. As used herein, the width of the access window generally refers to its extent in a substantially spanwise direction, wherein the length of the access window generally refers to its extent in a substantially chordwise direction.

In a preferred embodiment, the panel comprises a top surface and an opposing bottom surface, wherein at least part of the top surface is flush with the outer surface of the shell surrounding the access window. By arranging the panel such that its top surface is flush with the outer surface of the shell, the aerodynamic impact of the arrangement of the present invention can be minimized. In a preferred embodiment, the panel is substantially planar.

In a preferred embodiment, the panel comprises a central portion having a first thickness and an outer tongue portion having a second thickness, wherein the first thickness exceeds the second thickness, and wherein at least part of the outer tongue portion is arranged within the recessed portion at the inner surface of the shell. Thereby, it can be ensured that the top surface of the panel is substantially flush with the outer surface of the shell, despite the panel being arranged at the inner surface of the shell. Thus, in a preferred embodiment, the panel comprises a central portion having a first thickness and an outer tongue portion having a second thickness, wherein the first thickness exceeds the second thickness, and wherein at least part of the outer tongue portion is arranged within the recessed portion at the inner surface of the shell, wherein the top surface of the central portion of the panel is flush with the outer surface of the shell surrounding the access window. It is also preferred that the central portion of the panel having the first thickness is not arranged within the recessed portion at the inner surface of the shell. In some embodiments, the outer tongue portion is an annular flange.

According to a particularly preferred embodiment, the top surface of the panel comprises a central plateau surrounded by an annular flange. It is preferred that at least part of the annular flange is arranged within the recessed portion at the inner surface of the shell. It is also preferred that the central plateau is flush with the outer surface of the shell surrounding the access window.

In a preferred embodiment, the recessed portion comprises a groove formed within the shell, wherein the outer tongue portion of the panel is arranged in the groove to fasten the panel to the shell. Thus, the groove(s) formed within the shell may constitute the recessed portion at the inner surface of the shell. The recessed portion may comprise one or two grooves formed within the shell, wherein the groove extends substantially parallel to the outer blade surface. This offers an effective arrangement which further prevents undesired displacement of the panel from its closing position. It is preferred that the groove(s) extend substantially parallel to the outer shell surface. In some embodiments, each groove extends 1-10 cm in a spanwise or in a chordwise direction.

In a preferred embodiment, the panel is substantially rectangular or elliptical. For example, in one embodiment, the access window is rectangular, for example a square, and the panel is substantially rectangular, or substantially rectangular with round corners. Preferably, at least one dimension, such as the length, of the panel exceeds the respective dimension, such as the chordwise length, of the access window. Thus, the panel can be inserted into the blade through the slightly shorter access window, for example by inclining or tilting the panel, wherein the panel, once inserted into an interior space of the blade can be rotated and arranged within the recessed portion.

In a preferred embodiment, one or more sealing members, such as one or more gaskets, are arranged between the panel and the recessed portion at the inner surface of the shell. This advantageously provides a tight connection between the panel and the shell, thus preventing ingress of water and or loss of pressure from the within the blade. In a preferred embodiment, at least one annular gasket can be used which has substantially the same shape as the outer circumference of the panel. The sealing member may be adhesively fastened or bonded to the panel or to the shell.

In a preferred embodiment, the sealing member is an annular gasket, preferably comprising an ethylene propylene diene monomer (EPDM) material, such as an EPDM sponge rubber or EPDM foam. In some embodiments, the access window has a height of 450-650 mm, such as 500-600 mm, and a width of 350-550 mm, such as 400-500 mm. In a preferred embodiment, the access window covers an area of not more than 0.25 m2, such as not more than 0.2 m2. It was found that such comparatively small openings lead to minimal aerodynamic disturbance yet allowing the servicing of internal parts such as locking pin arrangements and connections of a lightning protection system.

In a preferred embodiment, the panel is biased against the inner surface of the shell. By using an inwardly mounted panel of the present invention, the panel will typically be biased against the inner surface of the shell. This means that the panel of the present invention does not require as many or as rigorous fastening means as prior art panels, since a firm connection between the panel and the inner surface of shell is ensured already by the pressure differential between the blade interior and the outside during operation.

In a preferred embodiment, the recessed portion prevents rotational movement of the panel relative to the shell. This can be achieved, for example, by providing the recessed portion as two separate recesses on either side of the access window, each recess having a substantially vertically extending side wall. When the panel is arranged in these recesses, rotation is prevented by the side walls abutting an edge or sidewall of the panel. Thus, in a preferred embodiment, the recessed portion comprises two substantially rectangular recesses.

In a preferred embodiment, the panel comprises a top surface and a bottom surface, wherein at least one hook member extends from the bottom surface of the panel, wherein at least one hook member extends from the inner surface of the shell, and wherein at least one elastic strap is fixed between the respective hook members extending from the bottom surface of the panel and from the inner surface of the shell for fastening the panel to the shell. This provides a particularly advantageous way of preventing unwanted displacement, in particular unwanted rotation, of the panel relative to the shell. Thus, a panel may be inserted through the access window by tilting the panel, followed by rotation, fastening of the strap between the respective hook members and the final arrangement of the panel within the recessed portion. In one embodiment, the panel comprises a least two hook members, preferably at opposing sides of the panel. Likewise, the inner surface of the shell comprises at least two hook members, preferably arranged at opposing sides adjacent to the access window.

In some embodiments, the panel is fastened to the shell by one or more fasteners, such as screws or rivets. In a preferred embodiment, the one or more fasteners are screw rivets. Screw rivets may be made of a polymer material such as nylon, and may comprise two separate parts which can be assembled. In other embodiments, the one or more fasteners comprise rivet screws, such as rivet screws which can be screwed into the threaded sleeve of a rivet tool, wherein the rivet sleeve can be inserted into a hole. Rivet screws may be used in combination with one or more additional screwed components for releasably fastening the cover member to the blade shell member. Preferably the one or more fasteners consist of one or more dielectric material. This is particularly advantageous when the access window is part of a lightning protection system of a wind turbine blade. In some embodiments, the dielectric material is a polymer, preferably a polyamide, preferably nylon, most preferred Nylon 6. It is thus preferred that the one or more fasteners are non-metallic fasteners.

In a preferred embodiment, the panel is rotatable from a first position to a second position in a plane substantially parallel to the outer surface of the shell surrounding the access window, wherein the first position allows for insertion of the panel into an interior space of the blade, and wherein the second position allows for arranging the panel within the recessed portion at the inner surface of the shell for closing the access window. This will advantageously facilitate the installation of the panel within the recessed portion, preferably in a position which prevents rotational displacement of the panel during operation. In addition, by designing the recessed portion such that the panel can only be arranged in the recessed portion in a single rotational position prevents installation mistakes, such as a wrong orientation of the panel.

In a preferred embodiment, the rotation from the first position to the second position in a plane substantially parallel to the outer surface of the shell surrounding the access window is a rotation by 60 to 120 degrees. Rotating the panel within an interior space of the blade during installation, may involve using one or more suction cups engaging a top surface of the panel.

In a preferred embodiment, the panel abuts the recessed portion at the inner surface of the shell adjacent to the access window, optionally separated by one or more sealing members, such as one or more gaskets. In a particularly preferred embodiment, the panel comprises a central portion having a first thickness and an outer tongue portion having a second thickness, wherein the first thickness exceeds the second thickness, and wherein at least part of the outer tongue portion is arranged within the recessed portion at the inner surface of the shell, such that the outer tongue portion of the panel abuts the recessed portion at the inner surface of the shell adjacent to the access window, optionally separated by one or more sealing members such as one or more gaskets.

In another aspect, the present invention relates to a method of manufacturing a wind turbine blade according to the present invention, the method comprising the steps of: manufacturing an aerodynamic shell having an outer surface forming at least part of an exterior surface of the wind turbine blade and an inner surface, wherein an access window extends through the shell, and wherein the aerodynamic shell comprises a recessed portion at the inner surface of the shell adjacent to the access window, inserting a panel through the access window into an interior space of the blade, arranging the panel within the recessed portion at the inner surface of the shell, and fixing the panel to the shell for closing the access window.

All embodiments and examples discussed above with respect to the wind turbine blade of the present invention likewise apply to the corresponding parts of the method of manufacturing the blade of the present invention.

The recessed portion at the inner surface of the shell may be provided during moulding of a shell half, such as a suction side shell half. For example, during lay-up of the fibre layers of the shell, one or more pre-manufactured composite parts may be arranged at or near a location of the later access window, optionally using a release film. One or more fibre layers and/or sandwich material can be arranged around said composition part. After curing and demoulding, the composite part can be removed or cut out resulting in a recessed portion at the inner blade surface.

In a preferred embodiment, the step of inserting the panel through the access window into an interior space of the blade comprises rotating the panel in a plane substantially parallel to the outer surface of the shell surrounding the access window, from a first position that allows for insertion of the panel into an interior space of the blade, to a second position that allows for arranging the panel within the recessed portion at the inner surface of the shell for closing the access window.

In a preferred embodiment, the rotation from the first position to the second position in a plane substantially parallel to the outer surface of the shell surrounding the access window is a rotation by 60 to 120 degrees.

In another aspect, the present invention relates to a method of manufacturing a wind turbine blade according to the present invention, the method comprising the steps of:
  manufacturing a pressure side shell half and a suction side shell half,
  arranging a spar structure within the pressure side shell half or within the suction side shell half, the spar structure comprising a first part and a second part, the first and second part being releasably coupled to each other by way of a locking pin extending through aligned respective apertures in each of the first and second part of the spar structure,
  cutting an access window through the suction side shell half or the pressure side shell half, preferably the suction side shell half,
  joining the pressure side shell half and the suction side shell half for obtaining a closed shell body,
  cutting the closed shell body along a cutting plane substantially normal to the spanwise direction of the closed shell body to obtain a first and a second blade segment, each blade segment comprising part of the pressure side shell half and part of the suction side shell half, wherein the spar structure extends across the cutting plane,
  uncoupling the first and second part of the spar structure by withdrawing the locking pin from the aligned respective apertures in each of the first and second part of the spar structure via the access window,
  separating the first blade segment from the second blade segment,
  joining and sealing the first blade segment to the second blade segment for obtaining the wind turbine blade, and arranging the panel within the recessed portion at the inner surface of the shell, and fixing the panel to the shell for closing the access window.

In a preferred embodiment, the method further comprises a step of re-inserting the locking pin into the aligned respective apertures in each of the first and second part of the spar structure via the access window, after joining and sealing the first blade segment to the second blade segment.

By manufacturing the wind turbine blade using a spar structure comprising a first part and a second part, releasably coupled to each other, an efficient and elegant method is provided for segmenting and re-assembling such wind turbine blade, including uncoupling and preferably re-coupling said parts.

Preferably, the pressure side shell half and the suction side shell half are manufactured over the entire length of the wind turbine blade, i.e. over their entire final length. The pressure side shell half and the suction side shell half will typically be adhered or bonded to each other near the leading edge and near the trailing edge. Each shell half may comprise longitudinally/spanwise extending load carrying structures, such as one or more main laminates or spar caps, preferably comprising reinforcement fibres such as glass fibres, carbon fibres, aramid fibres, metallic fibres, such as steel fibres, or plant fibres, or mixtures thereof. The shell halves will typically be produced by infusing a fibre lay-up of fibre material with a resin such as epoxy, polyester or vinyl ester.

Usually, the pressure side shell half and the suction side shell half are manufactured using mould structures. Each of the shell halves may comprise spar caps or main laminates provided along the respective pressure and suction side shell members. The spar caps or main laminates may be affixed to the inner faces of the shell halves. The spar structure is preferably a longitudinally extending load carrying structure, preferably comprising a beam or spar box for connecting and stabilizing the shell halves. The spar structure may be adapted to carry a substantial part of the load on the blade.

The spar structure preferably comprises a first part and a second part, the first and second part being releasably coupled to each other, such as releasably fixed or locked to each other. In some embodiments, the first and second part are releasably coupled to each other by one or more mechanical devices. In some embodiments, the first and second part are releasably coupled to each other by a mechanical locking mechanism. The second part of the spar structure may advantageously comprise a spar beam or a spar box. The first part of the spar structure may preferably comprise an arrangement for receiving the second part, such as a hollow member or a sheath.

The step of joining the pressure side shell half and the suction side shell half for obtaining a closed shell body may be carried out using any suitable joining mechanism or process, including adhesives, bonding material, mechanical fasteners, and any combination of the same. The closed shell is preferably a full-length preform of the final wind turbine blade obtainable by the method of the present invention.

In the step of cutting the closed shell body the closed shell is cut along a cutting plane substantially normal to the spanwise direction or longitudinal axis of the closed shell. In other words, the spanwise direction or longitudinal axis of the closed shell is substantially normal to said cutting plane. It is preferred that only the shell body is cut along the cutting plane. It is also preferred that the spar structure is not cut in this step.

In some embodiments, the first blade segment constitutes 30-80%, such as 40-70%, of the entire longitudinal extent of the blade. In some embodiments, the second blade segment constitutes 10-50%, such as 20-40%, of the entire longitudinal extent of the blade. Advantageously, the spar structure extends across the cutting plane, preferably without being cut. The first and second blade segments may include respective ends with complimentary joint sections that are joinable at a chord-wise joint.

The step of uncoupling the first and second part of the spar structure is preferably performed by unlocking a mechanical locking mechanism. After separating the first blade segment from the second blade segment, the individual blade segments may be individually transported, for example by respective trucks. The first blade segment and the second blade segment may be transported to an erection site for a wind turbine. The step of joining and sealing the first blade segment to the second blade segment for obtaining the wind turbine blade may advantageously be performed at the erection site of the wind turbine. This step may be carried out using any suitable joining and/or sealing mechanism or process, including adhesives, bonding material, mechanical fasteners, and any combination of the same.

In a preferred embodiment, the first part of the spar structure is fixed to the first blade segment. In some embodiments, the first part of the spar structure is glued or adhered to the first blade segment, preferably to both the partial suction side shell half and the partial pressure side shell half. In a preferred embodiment, the first part of the spar structure does not extend beyond the first blade segment.

According to some embodiments, the second part of the spar structure is fixed, such as glued or adhered, to the second blade segment, preferably to both partial shell halves. The second part of the spar structure preferably extends beyond the second blade segment into the first blade segment. Thus, the second part of the spar structure preferably protrudes from within the second part of the spar structure. In a preferred embodiment, the first blade segment comprises the root end of the blade. In another preferred embodiment, the second blade segment comprises the tip end of the blade. The blade may be also cut into more than two segments.

In some embodiments, the second part of the spar structure comprises a spar member, such as a spar beam or a spar box, the spar box preferably comprising at least one spar beam and at least one spar flange. In some embodiments, the first part of the spar structure comprises a receiving member, preferably a sheath member, for at least partly receiving or enclosing the second part of the spar structure. In some embodiments, the second part of the spar structure comprises a spar member, which is at least partly received or enclosed in a receiving structure. The receiving structure can be a jacket, for example a jacket comprising a mesh or net-like structure. In some embodiments, the jacket is made of the same material as the sheath member of the first part of the spar structure. It is preferred that the jacket is a conductive jacket.

According to some embodiments, the sheath member is substantially box-shaped. In other embodiments the sheath member is hollow. In other embodiments, the sheath member comprises a mesh or a net-structure. In a preferred embodiment, the sheath member is a conductive sheath member. In a preferred embodiment, the conductive sheath member is part of a lightning protection system of the wind turbine blade. In a preferred embodiment the conductive sheath member of the first part and the conductive jacket of the second part are both part of a lightning protections system of a wind turbine blade.

In a preferred embodiment, the spar structure comprises at least one locking pin for releasably coupling the first part to the second part of the spar structure through aligned respective locking apertures in each of the first and second part of the spar structure. In other embodiments, the spar structure comprises two or more, such as three or more, or four or more, locking pins and two or more, such as three or more, or four or more, respective locking apertures in each of the first and second part of the spar structure. Preferably, the locking apertures are respective through holes formed in the sheath member and the spar member, respectively.

In a preferred embodiment, the pressure side shell half and the suction side shell half are manufactured in respective mould halves, preferably by vacuum assisted resin transfer moulding. According to some embodiments, the pressure side shell half and the suction side shell half each have a longitudinal extent L of 50-90 m, preferably 60-80 m.

The access window of the present invention advantageously allows for installation of a chordwise locking pin for releasably coupling a first part to a second part of a spar structure. The access window may also be used to access internal parts within a wind turbine blade such as connections of a blade lightning protection system or for general maintenance operations. It was found that the access window of the present invention minimizes or completely avoids negative impacts on the aerodynamic performance and structural integrity of the wind turbine blade, while efficiently preventing influx and efflux of liquid or debris.

The present invention also relates to a wind turbine blade obtainable by the method of manufacturing a wind turbine blade as described above. The present wind turbine blade can be easily and efficiently assembled due to its spar structure and its coupling and de-coupling properties.

As used herein, the term "spanwise" is used to describe the orientation of a measurement or element along the blade from its root end to its tip end. In some embodiments, spanwise is the direction along the longitudinal axis and longitudinal extent of the wind turbine blade.

DESCRIPTION OF THE INVENTION

Figure 2:
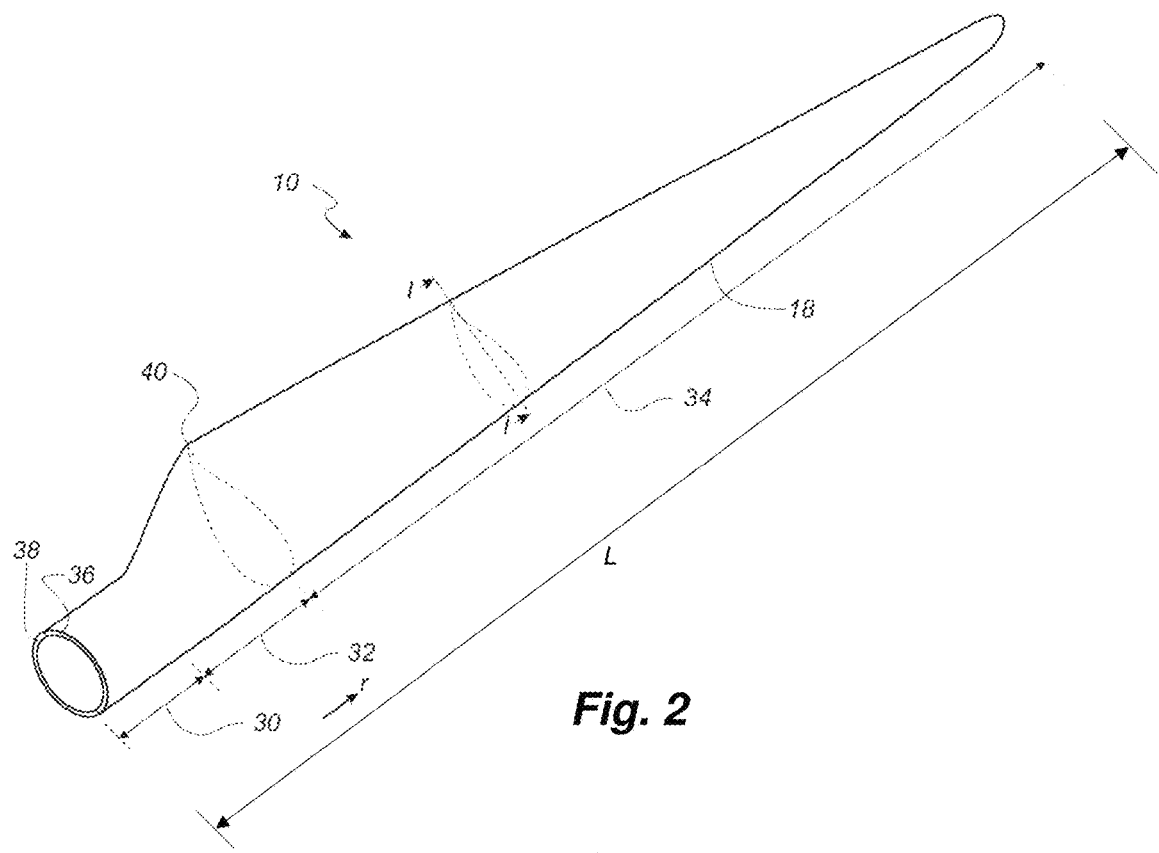
Figure 3:
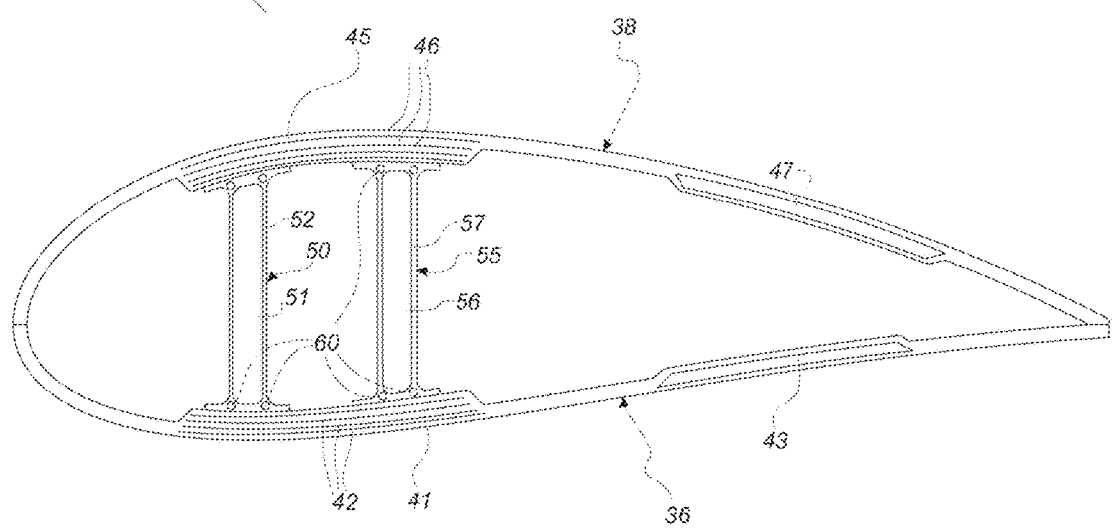
Figure 9:
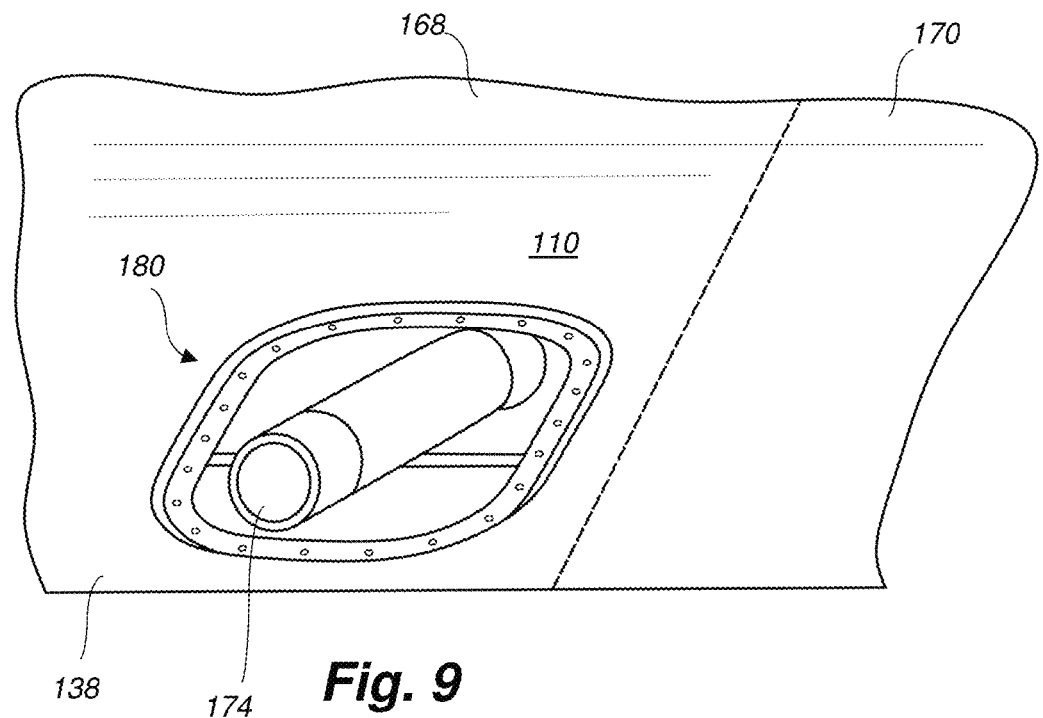
Figure 10:
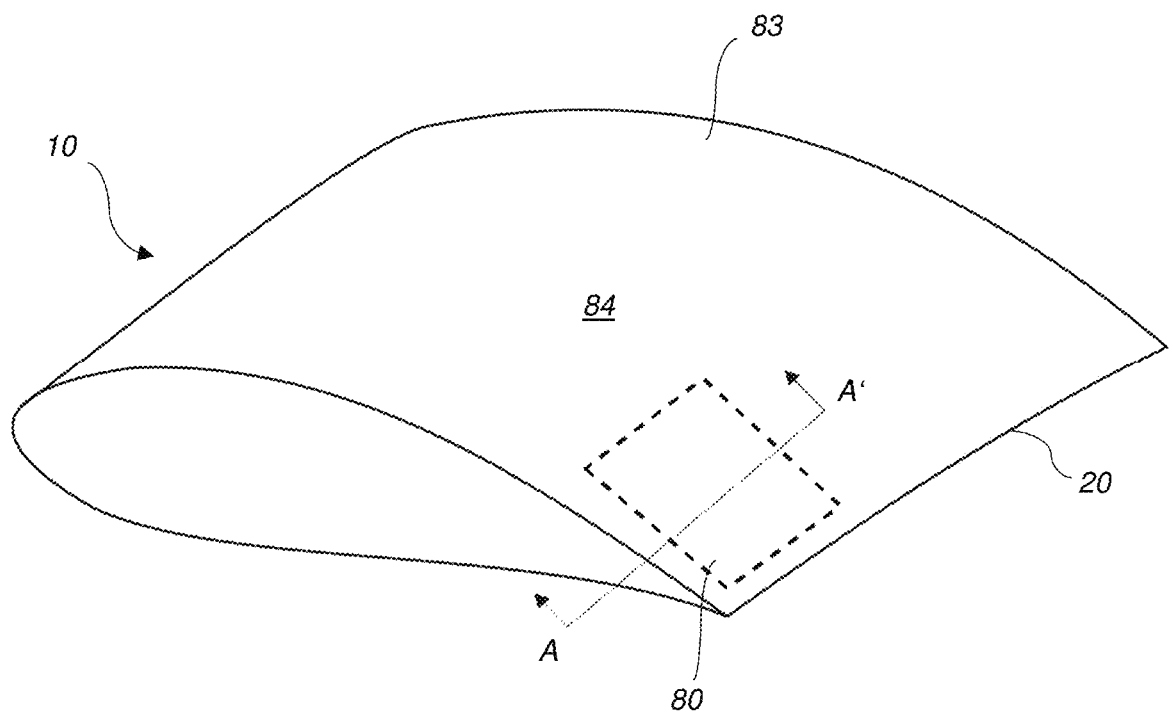
Figure 11:
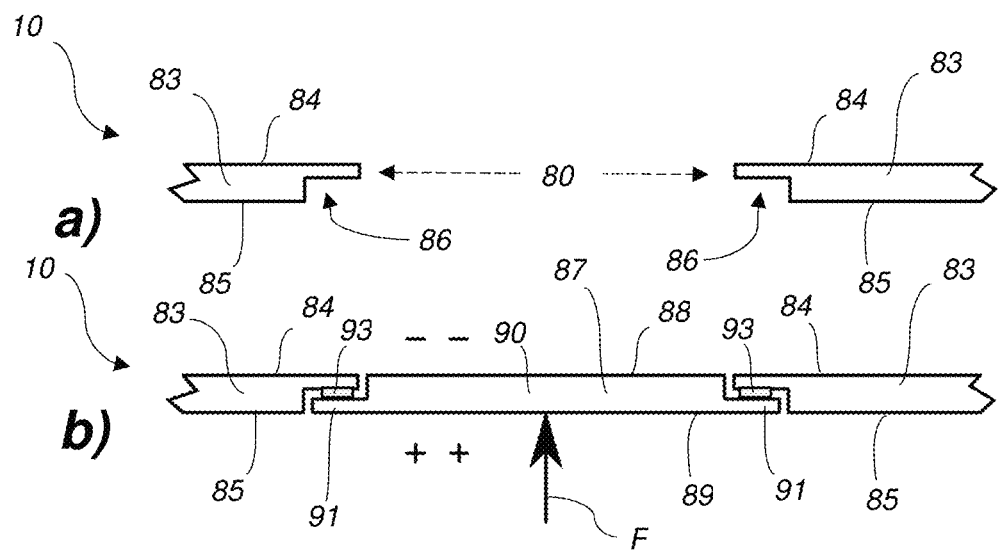
Figure 12:
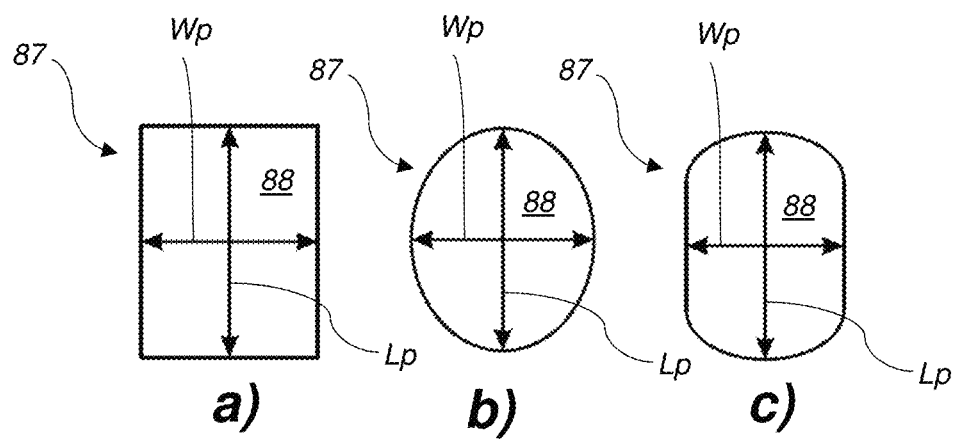
Figure 13:
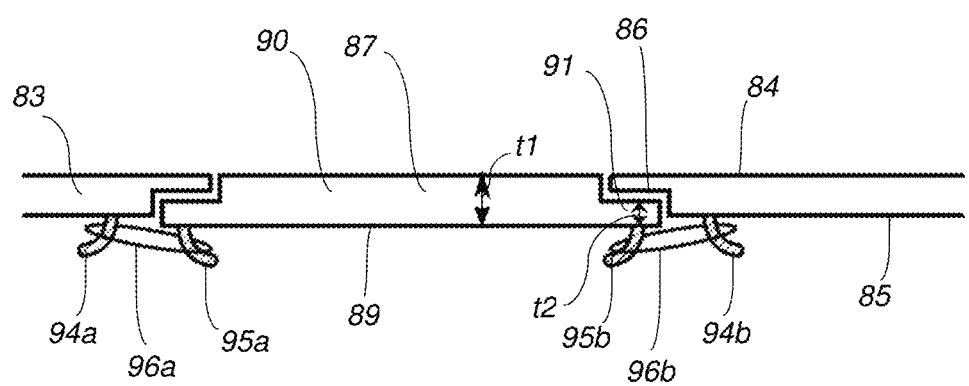

The invention is explained in detail below with reference to an embodiment shown in the drawings, in which FIG. 1 shows a wind turbine, FIG. 2 shows a schematic view of a wind turbine blade, FIG. 3 shows a schematic view of a cross-section of a wind turbine blade, FIG. 4 is a schematic cut-open view of a wind turbine blade, FIG. 5 is an enlarged view of the encircled section in FIG. 4, and FIGS. 6, 7 and 8 are perspective views of a spar structure, FIG. 9 is a partial perspective view of an access opening of a wind turbine blade, FIG. 10 is a perspective partial view of a wind turbine rotor blade, FIG. 11 is partial cross sectional view of a wind turbine rotor blade according to the present invention, taken along the line A-A' in FIG. 10, FIG. 12 is a schematic top view of different panels according to the present invention, and FIG. 13 is a partial cross sectional view of a wind turbine rotor blade according to one embodiment of the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

FIG. 2 shows a schematic view of a wind turbine blade 10. The wind turbine blade 10 has the shape of a conventional wind turbine blade 2 and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers.

The blade shells 36, 38 may comprise further fibre-reinforcement at the leading edge and the trailing edge. Typically, the shell parts 36, 38 are bonded to each other via glue flanges.

FIG. 4 is a schematic cut-open, exploded view of a wind turbine blade according to a co-pending application of the present applicant, wherein FIG. 5 is an enlarged view of the encircled section in FIG. 4. A pressure side shell half and a suction side shell half are typically manufactured over the entire length L of the wind turbine blade 10. A spar structure 62 is arranged within the shell. The spar structure 62 comprising a first part 64 and a second part 66, the first and second part being releasably coupled to each other, as shown in FIG. 8. The method advantageously comprises fixing the first part 64 of the spar structure 62 to one or both of the shell halves within the first blade segment 68 and fixing the second part 66 of the spar structure to one or both of the shell halves within the second blade segment 70.

The shell halves are then closed and joined, such as glued together for obtaining a closed shell, which is subsequently cut along a cutting plane 69 substantially normal to the spanwise direction or longitudinal extent of the blade to obtain a first blade segment 68 and a second blade segment 70. The cutting plane 69 coincides with an end surface 65 of the first part 64 of the spar structure.

As seen in FIGS. 4 and 5, the spar structure 62 extends across the cutting plane 69. As best seen in FIG. 5, the first part 64 of the spar structure 62, which takes the form of a box-shaped sheath member for at least partly enclosing the second part 66 of the spar structure in the illustrated embodiment, is fixed to the first blade segment 68. The second part 66 of the spar structure 62, which comprises a spar box in the illustrated embodiment, is fixed to the second blade segment 70, wherein the second part 66 extends beyond the second blade segment 70 into the first blade segment 68, when the blade segments are assembled.

FIG. 5 also illustrates an access opening 80 within the upper half of the illustrated shell for accessing the spar structure and coupling and uncoupling the first and second part of the spar structure 62. For uncoupling, a locking pin, as illustrated in FIGS. 6-8, is withdrawn from the aligned respective apertures 76, 78 in each of the first and second part of the spar structure via the access opening 80. Prior to, or after, joining and sealing the first blade segment 68 to the second blade segment 70 for obtaining the wind turbine blade, the method advantageously comprises re-coupling the first and second part of the spar structure, via the access opening 80, as illustrated in FIG. 8, by re-inserting the locking pin 74 into the aligned respective apertures 76, 78 in each of the first and second part of the spar structure. As seen in FIGS. 4 and 5, the cutting step d1) does not comprise cutting the spar structure, only the shell halves are cut. In addition, two shear webs 82a, 82b are arranged within the first blade segment.

FIGS. 6, 7 and 8 illustrate an embodiment of the spar structure 62 with the first part 64 in the form of a conductive, box-shaped sheath member according to a co-pending application of the present applicant. Preferably, the conductive sheath member is part of a lightning protection system of the wind turbine blade. The second part 66 of the spar structure comprises a box spar 67, part of which is encased in a jacket 72, for example comprising a conductive mesh 72. The spar structure 62 comprises a locking pin 74 for releasably coupling the first part 64 to the second part 66 of the spar structure through aligned respective locking apertures 76, 78 in each of the first and second part of the spar structure.

FIG. 9 is a partial perspective view of an access opening 180 of a wind turbine blade. The wind turbine blade comprises a shell member 138, such as a suction side shell half, with an outer surface 110. The shell member 138 may comprise a first segment 168, such as a root end segment, connected to a second segment 170, such as a tip end segment. An access opening 180 is provided in the blade shell member 138 for allowing access to a hollow space within the blade, e.g. for inserting or withdrawing a locking pin 174 as described above.

FIG. 10 is a partial perspective view of a wind turbine rotor blade 10 with a shell 83 having an outer surface 84, here illustrating the outer surface of a suction side shell half. In manufacturing the blade of the present invention, an access window 80 can be cut through the blade for allowing access to an interior space thereof, as indicated by the hatched line in FIG. 10. In the illustrated example of FIG. 10, the access window is substantially rectangular and is provided close to the trailing edge 20 of the blade.

FIG. 11a is partial cross sectional view across the suction side shell half of a wind turbine blade according to the present invention, taken along the line A-A' in FIG. 10, in which the access window 80 has been cut into the shell 83, giving access to an interior space of the blade 10. The aerodynamic shell 83 has an outer surface 84 forming at least part of an exterior surface of the wind turbine blade and an inner surface 85. The shell 83 comprises a recessed portion 86 at the inner surface 85 of the shell 83 adjacent to the access window 80. Here the recessed portion is provided in a stepped configuration, wherein the thickness of the shell 83 decreases in a discrete step towards the access window.

As shown in FIG. 11b, a panel 87 arranged within the recessed portion 86 at the inner surface 85 of the shell 83 for closing the access window 80. During operation, the panel 87 is biased against the inner surface of the shell 83 by means of the pressure difference between the interior space of the blade and the outside, in particular the outside of the suction half of the shell. Such pressure difference will typically occur as pressure builds up inside the blade due to the centrifugal effect, whereas at the outside of the blade, the pressure is reduced due to the aerodynamic shape of the airfoil leading to high flow velocities above the suction side shell half. With the inwardly mounted panel of the present invention, the resulting pressure difference biases the panel against the recessed portion optionally via gasket 93, thus reducing the risk of pressure leakage and water ingress. As also illustrated, the panel 87 comprises a top surface 88 and a bottom surface 89, wherein at least part of the top surface 88 is flush with the outer surface 84 of the shell 83 surrounding the access window 80.

FIG. 12 is a schematic top view of illustrating different shapes of the panel according to the present invention. The panel can, for example, be rectangular, rectangular with rounded corners, elliptical, or oval. Advantageously, the length Lp of the panel 87 exceeds the width Wp of the panel 87. This allows the panel 87 to be rotatable from a first position to a second position in a plane substantially parallel to the outer surface of the shell 83 surrounding the access window 80, such that the first position allows for insertion of the panel 87 into an interior space of the blade, wherein the second position allows for arranging the panel 87 within the recessed portion 86 at the inner surface of the shell 83 for closing the access window 80.

FIG. 13 is a partial cross sectional view across a suction side shell half of a wind turbine rotor blade according to one embodiment of the present invention. Two hook members 95a, 95b extend from the bottom surface of the panel 87. Likewise, two hook members 94a, 94b extend from the inner surface 85 of the shell 83. Elastic straps 96a, 96b are fastened to the respective hook members 94a, 95a and 94b, 95b for fixing the panel 87 to the shell 83. The elastic straps can be fastened around the hook members during insertion and rotation of the panel.

In the embodiment illustrated in FIG. 13, the panel 87 comprises a central portion 90 having a first thickness t1 and an outer tongue portion 91 having a second thickness t2, wherein the first thickness t1 exceeds the second thickness t2, and wherein at least part of the outer tongue portion 91 is arranged within the recessed portion 86 at the inner surface of the shell 83.

The invention is not limited to the embodiments described herein and may be modified or adapted without departing from the scope of the present invention.

LIST OF REFERENCE NUMERALS 4 tower
6 nacelle
8 hub
10 blades
14 blade tip
16 blade root
18 leading edge
20 trailing edge
30 root region
32 transition region
34 airfoil region
36 pressure side shell part
38, 138 suction side shell part
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
62 spar structure
64 first part
65 end surface of first part
66 second part
67 spar member
68, 168 first blade segment
69 cutting plane
70, 170 second blade segment
72 jacket/mesh
74, 174 locking pin
76 aperture
78 aperture
80, 180 access window
82 shear web
83 shell
84 outer surface of shell
85 inner surface of shell
86 recessed portion
87 panel
88 top surface of panel
89 bottom surface of panel
90 central portion of panel
91 tongue portion of panel
93 gasket
94 hook member in shell
95 hook member in panel
96 elastic strap
F force created by pressure difference
L length
Lp length of panel
r distance from hub
R rotor radius
t1,2 first and second thickness
Wp width of panel

The invention claimed is:

1. A wind turbine blade, comprising:
a profiled contour comprising a pressure side and a suction side, and a leading edge and a trailing edge with a chord having a chord length extending therebetween, the wind turbine blade extending in a spanwise direction between a root end and a tip end;
an aerodynamic shell having an outer surface forming at least part of an exterior surface of the wind turbine blade, and an inner surface,
an access window extending through the aerodynamic shell, wherein the aerodynamic shell comprises a recessed portion at the inner surface of the aerodynamic shell adjacent to the access window, and
a panel arranged within the recessed portion at the inner surface of the aerodynamic shell for closing the access window, wherein the panel comprises a top surface and a bottom surface, wherein at least one first hook member extends from the bottom surface of the panel, wherein at least one second hook member extends from the inner surface of the aerodynamic shell, and wherein at least one elastic strap is fixed between the at least one first and second hook members extending from the bottom surface of the panel and from the inner surface of the aerodynamic shell for fastening the panel to the aerodynamic shell.

2. The wind turbine blade of claim 1, wherein the recessed portion is provided in a stepwise design in that a thickness of the aerodynamic shell decreases in one or more discreet steps towards the access window.

3. The wind turbine blade of claim 1, wherein the panel has a width and a length, wherein the length of the panel exceeds the width of the panel.

4. The wind turbine blade of claim 1, wherein at least part of the top surface is flush with the outer surface of the aerodynamic shell surrounding the access window.

5. The wind turbine blade of claim 1, wherein the panel comprises a central portion having a first thickness and an outer tongue portion having a second thickness, wherein the first thickness exceeds the second thickness, and wherein at least part of the outer tongue portion is arranged within the recessed portion at the inner surface of the aerodynamic shell.

6. The wind turbine blade of claim 5, wherein the recessed portion comprises a groove formed within the aerodynamic shell, and wherein the outer tongue portion of the panel is arranged in the groove to fasten the panel to the aerodynamic shell.

7. The wind turbine blade of claim 1, wherein the panel is substantially rectangular or elliptical.

8. The wind turbine blade of claim 1, further comprising one or more sealing members arranged between the panel and the recessed portion at the inner surface of the aerodynamic shell.

9. The wind turbine blade of claim 1, wherein the panel is biased against the inner surface of the aerodynamic shell.

10. The wind turbine blade of claim 1, wherein the panel is rotatable from a first position to a second position in a plane substantially parallel to the outer surface of the aerodynamic shell surrounding the access window, wherein the first position allows for insertion of the panel into an interior space of the wind turbine blade, and wherein the second position allows for arranging the panel within the recessed portion at the inner surface of the aerodynamic shell for closing the access window.

11. The wind turbine blade of claim 10, wherein the rotation from the first position to the second position in a plane substantially parallel to the outer surface of the aerodynamic shell surrounding the access window is a rotation by 60 to 120 degrees.

12. The wind turbine blade of claim 1, wherein the panel abuts the recessed portion at the inner surface of the aerodynamic shell adjacent to the access window.

13. The wind turbine blade of claim 1, wherein the panel is separated from the recessed portion by one or more sealing members.

14. A method, comprising:
  manufacturing an aerodynamic shell having an outer surface forming at least part of an exterior surface of a wind turbine blade and an inner surface, wherein an access window extends through the aerodynamic shell, and wherein the aerodynamic shell comprises a recessed portion at the inner surface of the aerodynamic shell adjacent to the access window;
  inserting a panel through the access window into an interior space of the wind turbine blade;
  arranging the panel within the recessed portion at the inner surface of the aerodynamic shell; and
  fixing the panel to the aerodynamic shell for closing the access window, wherein the panel comprises a top surface and a bottom surface, wherein at least one first hook member extends from the bottom surface of the panel, wherein at least one second hook member extends from the inner surface of the aerodynamic shell, and wherein at least one elastic strap is fixed between the at least one first and second hook members extending from the bottom surface of the panel and from the inner surface of the aerodynamic shell for fastening the panel to the aerodynamic shell.

15. The method of claim 14, wherein inserting the panel through the access window into the interior space of the wind turbine blade further comprises:
  rotating the panel in a plane substantially parallel to the outer surface of the aerodynamic shell surrounding the access window,
  from a first position that allows for insertion of the panel into an interior space of the wind turbine blade,
  to a second position that allows for arranging the panel within the recessed portion at the inner surface of the aerodynamic shell for closing the access window.

16. The method of claim 15, wherein the rotation from the first position to the second position in a plane substantially parallel to the outer surface of the aerodynamic shell surrounding the access window is a rotation by 60 to 120 degrees.

* * * * *